United States Patent
Cheng et al.

(10) Patent No.: US 9,268,386 B2
(45) Date of Patent: Feb. 23, 2016

(54) METHODS AND SYSTEMS FOR DYNAMIC SERVICE FLOW USING AVAILABLE BATTERY POWER

(75) Inventors: Steven Cheng, San Diego, CA (US); Kuo-Chun Lee, San Diego, CA (US); Guangming Carl Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 12/351,802

(22) Filed: Jan. 9, 2009

(65) Prior Publication Data

US 2010/0178900 A1    Jul. 15, 2010

(51) Int. Cl.
*G06F 1/32* (2006.01)
*H04W 52/02* (2009.01)

(52) U.S. Cl.
CPC .............. *G06F 1/3203* (2013.01); *G06F 1/324* (2013.01); *G06F 1/3287* (2013.01); *H04W 52/0261* (2013.01); *Y02B 60/1217* (2013.01); *Y02B 60/1282* (2013.01); *Y02B 60/50* (2013.01)

(58) Field of Classification Search
USPC ............... 455/127.5, 574, 343.1–343.5, 13.4, 455/522, 572, 414.1; 370/311; 340/7.35
See application file for complete search history.

(56) References Cited

U.S. PATENT DOCUMENTS

| 4,670,837 A * | 6/1987 | Sheets ........................ 713/501 |
| 5,632,038 A | 5/1997 | Fuller |
| 6,493,331 B1 | 12/2002 | Walton et al. |
| 6,898,438 B1 | 5/2005 | Uchida |
| 7,027,843 B2 * | 4/2006 | Cromer et al. ................ 455/574 |
| 7,407,108 B1 | 8/2008 | Euler et al. |
| 7,450,973 B2 | 11/2008 | Choi et al. |
| 7,960,945 B1 * | 6/2011 | Onorato et al. ............... 320/132 |
| 8,135,443 B2 | 3/2012 | Aleksic et al. |
| 2002/0055961 A1 * | 5/2002 | Chauvel et al. ............... 708/100 |
| 2003/0193923 A1 | 10/2003 | Abdelgany et al. |
| 2004/0106441 A1 | 6/2004 | Kazakevich et al. |
| 2004/0117674 A1 | 6/2004 | Gutman et al. |
| 2004/0180701 A1 * | 9/2004 | Livet et al. ..................... 455/574 |
| 2004/0204181 A1 * | 10/2004 | Cromer et al. ................ 455/574 |
| 2006/0111156 A1 | 5/2006 | Choi et al. |
| 2006/0223465 A1 * | 10/2006 | Akiba et al. ............... 455/127.4 |
| 2006/0285494 A1 | 12/2006 | Li et al. |

(Continued)

FOREIGN PATENT DOCUMENTS

| CN | 101009933 A | 8/2007 |
| CN | 100447711 C | 12/2008 |

(Continued)

OTHER PUBLICATIONS

International Search Report and Written Opinion—PCT/US2012/059081—ISA/EPO—Dec. 29, 2012.

(Continued)

*Primary Examiner* — Junpeng Chen
(74) *Attorney, Agent, or Firm* — Darren M. Simon

(57) ABSTRACT

Certain embodiments of the present disclosure relate to methods for improving a service flow of a mobile device based upon a different level of its available battery power. If the battery power availability is below a predefined threshold, then one or more power-saving techniques can be triggered that increase an air time of the mobile device and provide savings of power consumption at different rates using a different level of clock rate.

12 Claims, 8 Drawing Sheets

(56) References Cited

U.S. PATENT DOCUMENTS

| | | | |
|---|---|---|---|
| 2007/0049354 A1* | 3/2007 | Jin et al. | 455/574 |
| 2007/0057767 A1* | 3/2007 | Sun et al. | 340/7.35 |
| 2007/0081504 A1* | 4/2007 | Shih et al. | 370/338 |
| 2007/0142098 A1 | 6/2007 | Behzad et al. | |
| 2007/0224951 A1* | 9/2007 | Gilb et al. | 455/127.5 |
| 2008/0287080 A1* | 11/2008 | Camp et al. | 455/127.5 |
| 2010/0191861 A1 | 7/2010 | Cheng et al. | |
| 2010/0248646 A1 | 9/2010 | Yamazaki et al. | |
| 2011/0268000 A1 | 11/2011 | Kashikar et al. | |
| 2012/0108224 A1 | 5/2012 | Cheng et al. | |

FOREIGN PATENT DOCUMENTS

| | | |
|---|---|---|
| JP | 2000069107 A | 3/2000 |
| JP | 2000357987 A | 12/2000 |
| JP | 2003218769 A | 7/2003 |
| JP | 2003258718 A | 9/2003 |
| TW | 200715104 | 4/2007 |
| WO | 0176098 A2 | 10/2001 |
| WO | 2010081055 A2 | 7/2010 |

OTHER PUBLICATIONS

International Search Report and Written Opinion—PCT/US2010/020569, International Search Authority—European Patent Office—Aug. 23, 2010.

Taiwan Search Report—TW099100598—TIPO—Feb. 26, 2013

Taiwan Search Report—TW101137169—TIPO—Aug. 1, 2014.

* cited by examiner

METHODS AND SYSTEMS FOR DYNAMIC SERVICE FLOW USING AVAILABLE BATTERY POWER

TECHNICAL FIELD

Certain embodiments of the present disclosure generally relate to a wireless communication and, more particularly, to methods for improving a data transmission of a mobile device.

BACKGROUND

The current wireless communication protocols range from a 4th generation (4G) such as Worldwide Interoperability for Microwave Access (WiMAX), to a 3rd generation (3G) such as an Universal Mobile Telecommunications System (UMTS) and an Evolution-Data Optimized (EV-DO) standard, to a 2nd generation (2G) such as a Code Division Multiple Access (CDMA) and a Global System for Mobile communications (GSM). All of these communication protocols consider a service flow feature and a Quality of Service (QoS) feature of every connection link between a mobile device and a base station, but these particular features are not integrated with any issues related to battery availability of the mobile device.

Unfortunately, if battery power at the mobile device becomes low, then the mobile device cannot guarantee that the service flow feature and the QoS feature can be correctly implemented.

SUMMARY

Certain embodiments provide a method for wireless communications. The method generally includes establishing one or more wireless connections with a network, monitoring available battery power at a mobile device, and reducing an allowable average data rate of the connections as a function of the available battery power.

Certain embodiments provide an apparatus for wireless communications. The apparatus generally includes logic for establishing one or more wireless connections with a network, logic for monitoring available battery power at a mobile device, and logic for reducing an allowable average data rate of the connections as a function of the available battery power.

Certain embodiments provide an apparatus for wireless communications. The apparatus generally includes means for establishing one or more wireless connections with a network, means for monitoring available battery power at a mobile device, and means for reducing an allowable average data rate of the connections as a function of the available battery power.

Certain embodiments provide a computer-program product for wireless communications, comprising a computer readable medium having instructions stored thereon, the instructions being executable by one or more processors. The instructions generally include instructions for establishing one or more wireless connections with a network, instructions for monitoring available battery power at a mobile device, and instructions for reducing an allowable average data rate of the connections as a function of the available battery power.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
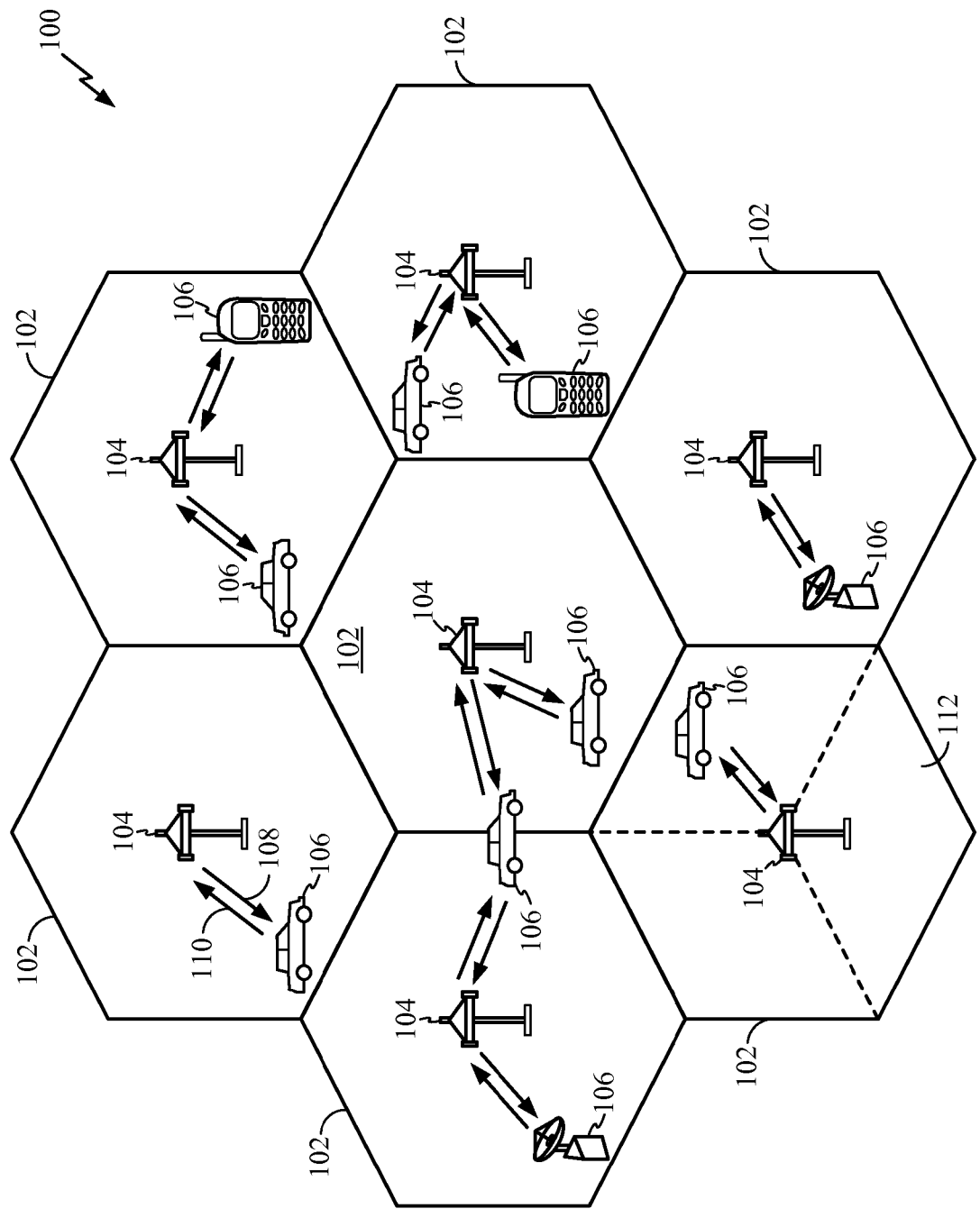
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
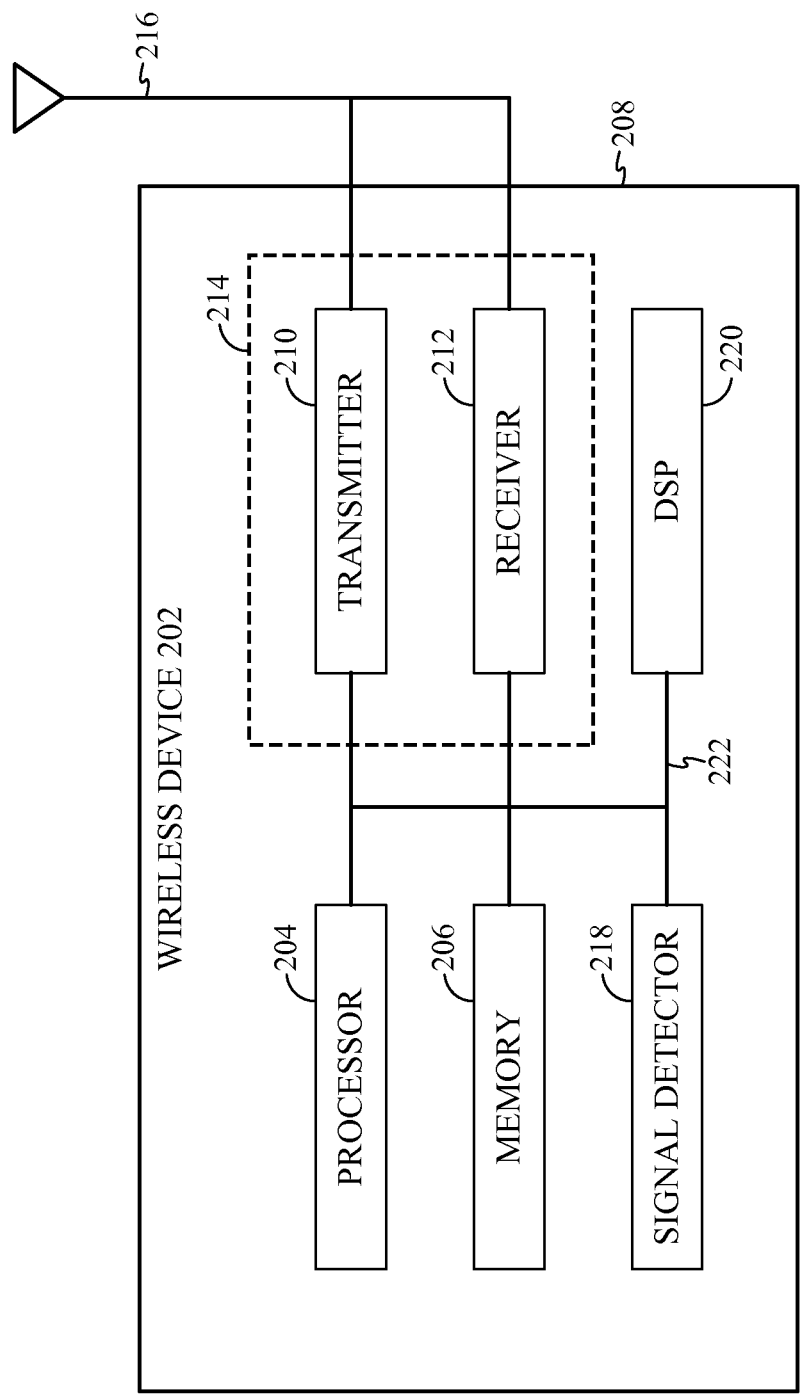
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
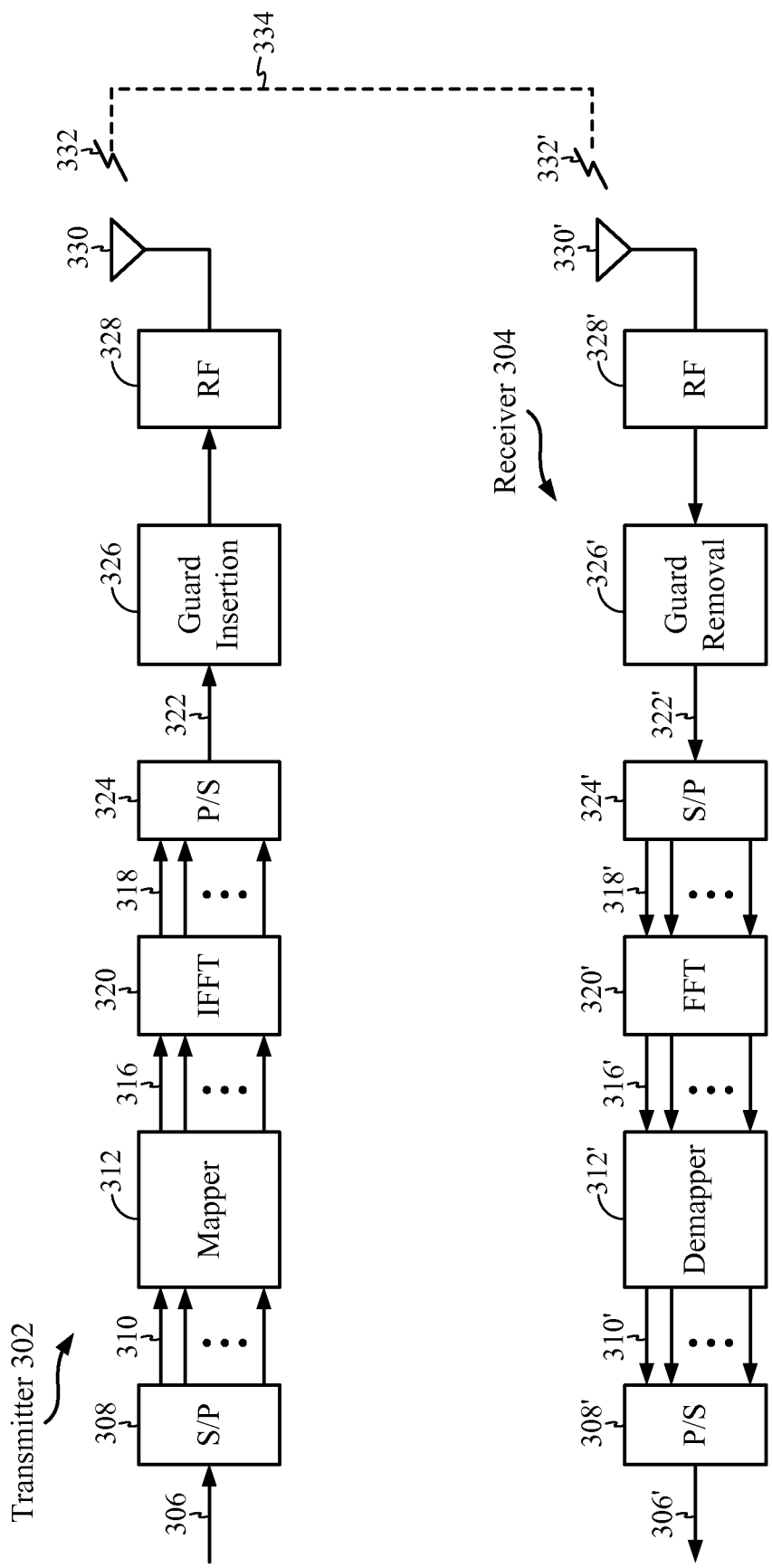
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Dynamic Service Flow Using Available Battery Power

Certain embodiments of the present disclosure provide solutions that may extend useful lifetime of communications ("air time") for a battery powered mobile device. By monitoring availability of battery power at the mobile device and adjusting one or more processing parameters (e.g., a clock rate, allowable data rate, etc.) based at least on service flows, air time may be extended by reducing power consumption, when possible, while still satisfying QoS requirements.

Techniques according to certain embodiments may utilize a step function in order to limit a maximal average data rate at the mobile device under different threshold values of the available battery power. As will be described in greater detail below, once the maximal average data rate is predictable, then a maximal millions of instructions per second (MIPS) consumption rate may also be predictable. As a result, a mobile device may be able to reduce processor clock rates, based on a predicted MIPS consumption rate, to reduce overall power consumption.

For certain embodiments, under certain conditions, MIPS consumption rate may also be reduced. For example, once a mobile device detects battery power is at or below a certain threshold value, then the device may be able to adjust the MIPS consumption rate as well as the processor clock rate of the mobile device. Therefore, the communication link between the mobile device and a base station may be maintained much longer (e.g., exponentially by a square factor) when compared with conventional techniques. Techniques proposed herein may be applied to all wireless communication protocols ranged from the 2G, 3G, and 4G, as well as from long range protocols to short range protocols.

Figure 4:
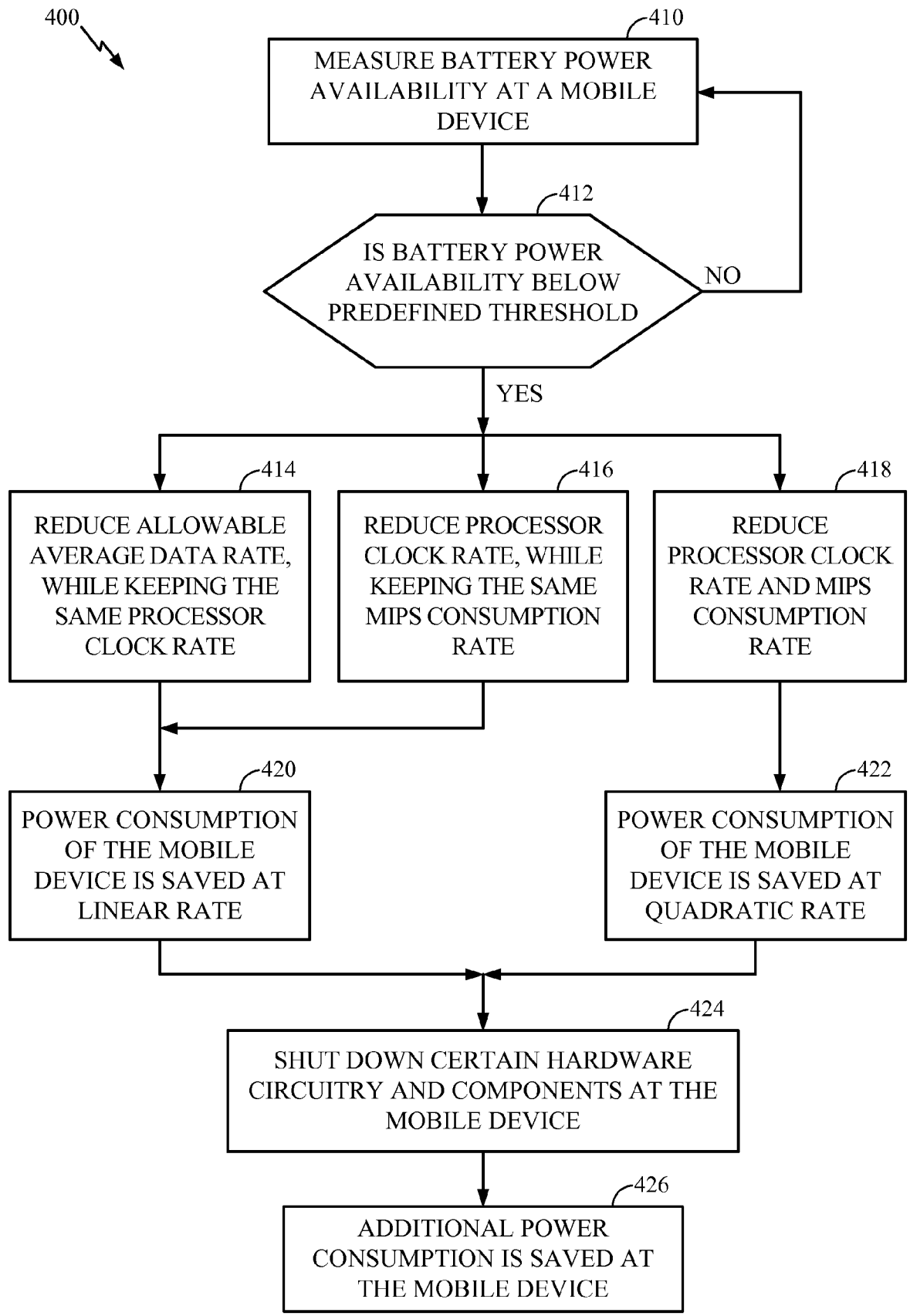
FIG. 4 shows example operations for saving power consumption at a mobile device in accordance with certain embodiments of the present disclosure.

FIG. 4 shows example operations 400 for conserving power at a mobile device. The illustrated operations include operations for reducing allowable data rate and/or reducing processor clock rate (with or without reducing the device MIPS consumption rate).

At 410, the mobile device may measure its battery power availability. If the battery availability is below a predefined threshold value (as determined at 412), then the allowable average data rate may be reduced, at 414, while keeping the same processor clock rate. Therefore, the power consumption of the mobile device may be saved at a linear rate, at 420.

According to certain embodiments, when the available battery power is below the predefined threshold value, the average data rate may be significantly reduced (at 414). Such a significant reduction in data rate may be accompanied by a significant reduction in MIPS consumption rate. For such a scenario, communication latency may not be of great importance (e.g., maintaining a connection at all in such a low battery state may be sufficient).

Figure 6:
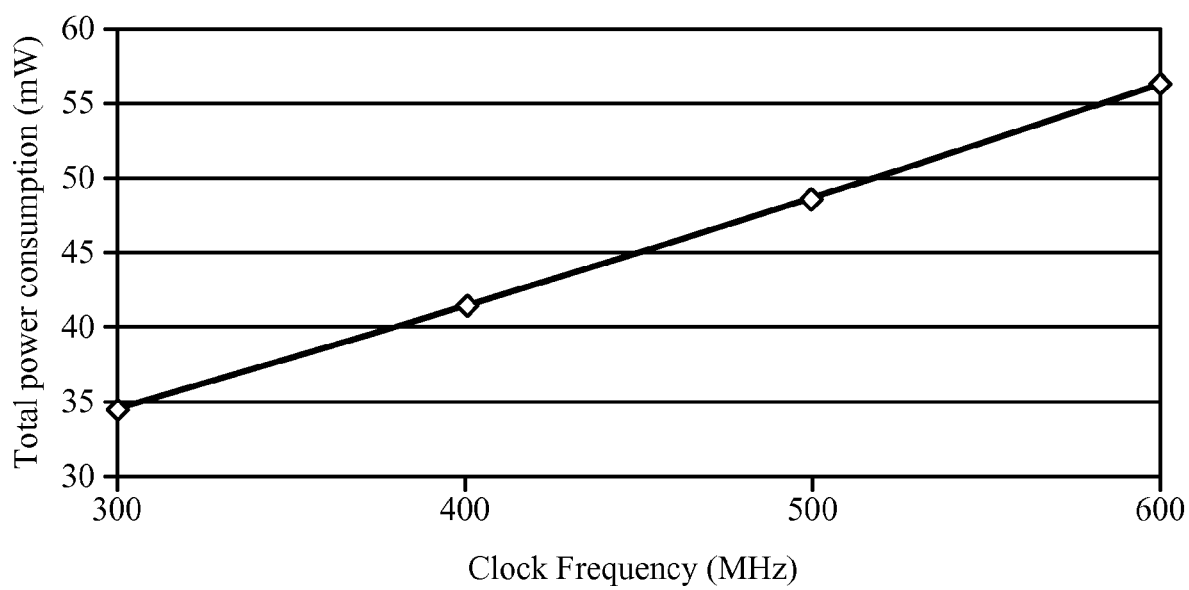
FIG. 6 illustrates a power consumption at the mobile device versus a processor clock rate when the processor consumes a fixed Millions of Instructions per Second (MIPS) rate in accordance with certain embodiments of the present disclosure.

Therefore, for certain embodiments, the processor clock rate may be reduced, at 416, while the same MIPS consumption rate may be utilized. Consequently, at 420, the power consumption of the mobile device may be again saved at the linear rate. As shown in FIG. 6, lower processor clock rate of 300 MHz can reduce the power consumption by up to 50% compared to the case of higher processor clock rate of 600 MHz.

According to certain embodiments, once the maximal average data rate is predictable, the maximal MIPS consumption rate is also predictable. Therefore, for certain embodiments, at 418, the processor clock rate and MIPS consumption rate may both be reduced. In this scenario, power consumption of the mobile device may be saved at a quadratic rate, at 422.

According to certain embodiments, the mobile device may be configured to shut down certain hardware circuitry and components, at 422, in order to save additional power consumption. With such components powered down, additional power consumption may be saved, at 426.

Figure 5:
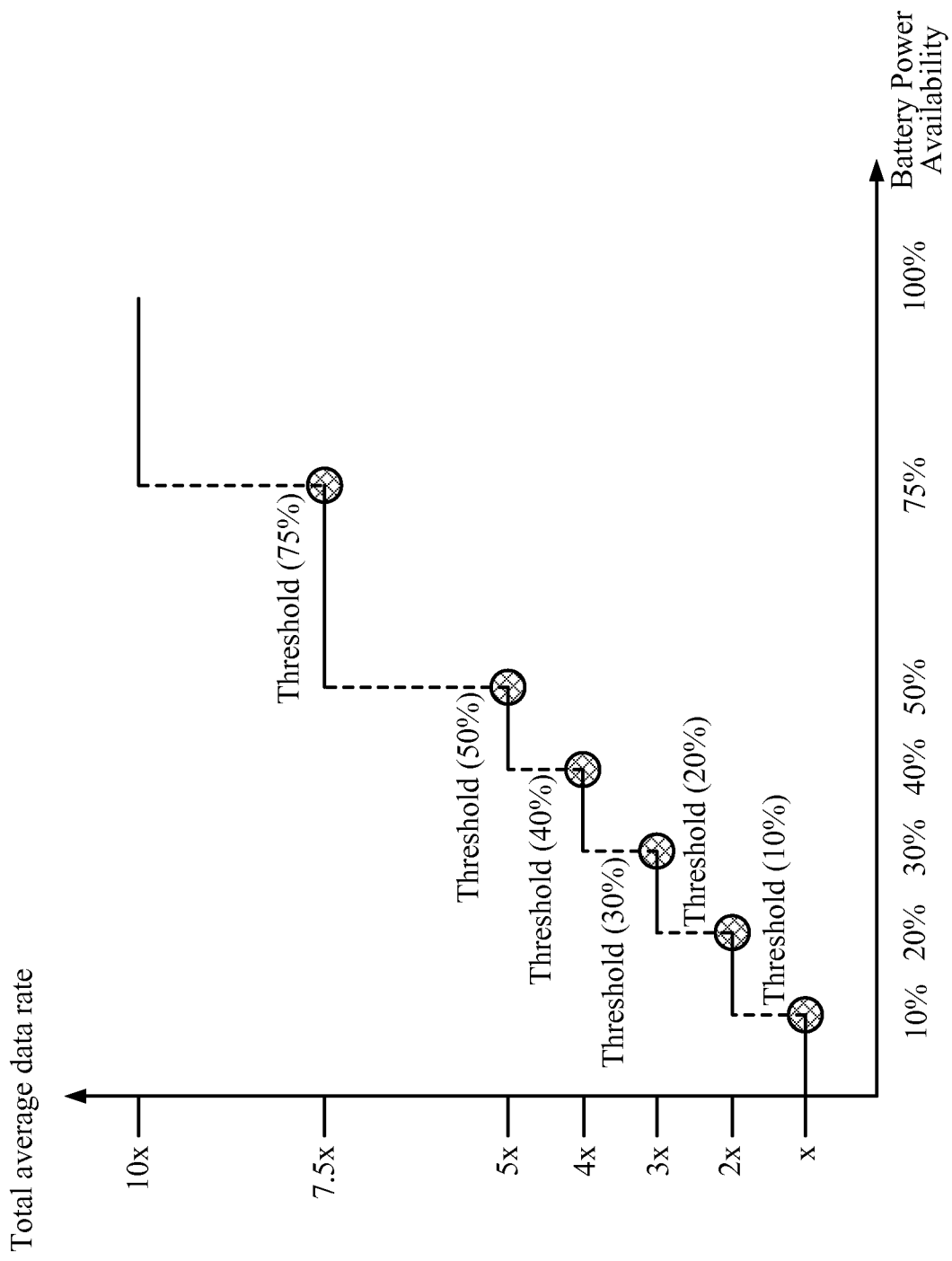
FIG. 5 illustrates a total average data rate step function with input parameter of battery power availability in accordance with certain embodiments of the present disclosure.

According to certain embodiments, total allowable average (uplink and downlink) data rate may be varied as a step function based upon the range of battery power availability at the mobile device (i.e., threshold values of battery power), as shown in FIG. 5. Different QoS categories may define maximal, minimal, and average data rate for every communication link in the system. The total data rate may be obtained as a sum of the traffic of all links belonging to uplink and downlink. When the data rate is applied according to the exemplary step function from FIG. 5, then the total average data rate of 5·x may be obtained, where x is a constant data rate value.

A total number of instructions I executed on a processor of the mobile device for a given time period T may be represented as:

$$I = V \cdot T, \quad (1)$$

where V is a speed of incoming instructions. A total power consumed by I instructions within the time period T may be represented as:

$$P_{total} = P_{initial} + I \cdot \frac{P_i}{T}, \quad (2)$$

where $P_{initial}$ is an initial power consumed by the processor of the mobile device when no instruction is executed, and $P_i$ is an average consumed power per a single instruction.

From equation (1) and equation (2) it follows that:

$$P_{total} = P_{initial} + V \cdot P_i.  \quad (3)$$

It can be observed from equation (3) that the speed of incoming instructions V may be proportional to the power consumption. Therefore, when the speed of incoming instructions is decreased (i.e., when the data rate is decreased), then the MIPS consumption rate may be automatically reduced according to equation (1), and the power consumption is saved at a linear rate as given by equation (3). It can be assumed that the processor clock rate may be constant. As illustrated in FIG. 5, the present disclosure proposes to gracefully reduce the data rate of the mobile device using the step function when the battery power is below the predetermined threshold value. As a result, the power consumption may be saved at the linear rate.

As illustrated in FIG. 5, for an exemplary case of a threshold activation point equal to 50% of the total battery power availability, if the battery availability is below 40% of the predefined threshold value, then the allowable average data rate may be reduced by 20%; if the battery availability is below 30% of the threshold value, then the allowable average data rate may be reduced by 40%; if the battery availability is below 20% of the threshold value, then the allowable average data rate may be reduced by 60%; if the battery availability is below 10% of the threshold value, then the allowable average data rate may be reduced by 80%. Thus, by performing this technique, air time of the mobile device may be extended by up to 2.5 times, while the mobile device may still provide some degree of data transmission and receiving functionality.

According to certain embodiments, if the mobile device does not drop any communication link after reducing the average data rate, then the mobile device may be configured to further reduce overall data rate by varying the allowable data rate for certain links. For example, the mobile device may reduce the data rate or postpone communications for some communication links with lower QoS or with lower priority, in an effort to reduce overall average data rate. Furthermore, for certain embodiments, a mobile user may be allowed to create new links for different application, but with the restriction that these new links may be at lower data rates.

In current wireless communications protocols, even when the QoS and data rate of each communication link is considered, there may still be an issue of determining priority among different links. The priority among communication links may be defined only through associated QoS values for each individual link. That is, priority levels of any two communication links may be compared according to their QoS values. If, for example, two communication links have the same QoS value, then they have the same priority.

There are several heuristic techniques that can be proposed to solve the issue of same priority of different communication links. For certain embodiments, the user may be prompted from the wireless network to reprioritize its communication links by utilizing other parameters rather than the QoS parameter. The reprioritization process may be performed either during an initial configuration of the mobile device or when the available battery power drops below certain predefined threshold value. For certain embodiments, the average uplink data rate of communication links with equal priority may be automatically reduced, and the system may inform the user regarding this particular change that is due to a lower battery scenario.

For certain embodiments, the mobile device may reconfigure the average data rate for chosen communication links through a layer 3 (L3) channel/link reconfiguration process between the mobile device and the serving base station. The mobile device may send messages to alert the user of the mobile device that some low priority communication links can be automatically dropped, or the communication of lower priority links can be postponed. In the latter case the user may be asked to decide whether these communication links should be dropped or the transmission and reception should be continued using a lower data rate. Furthermore, the latter solution may require a reconfiguration of uplink and downlink data rates for certain number of communication links.

Figure 7:
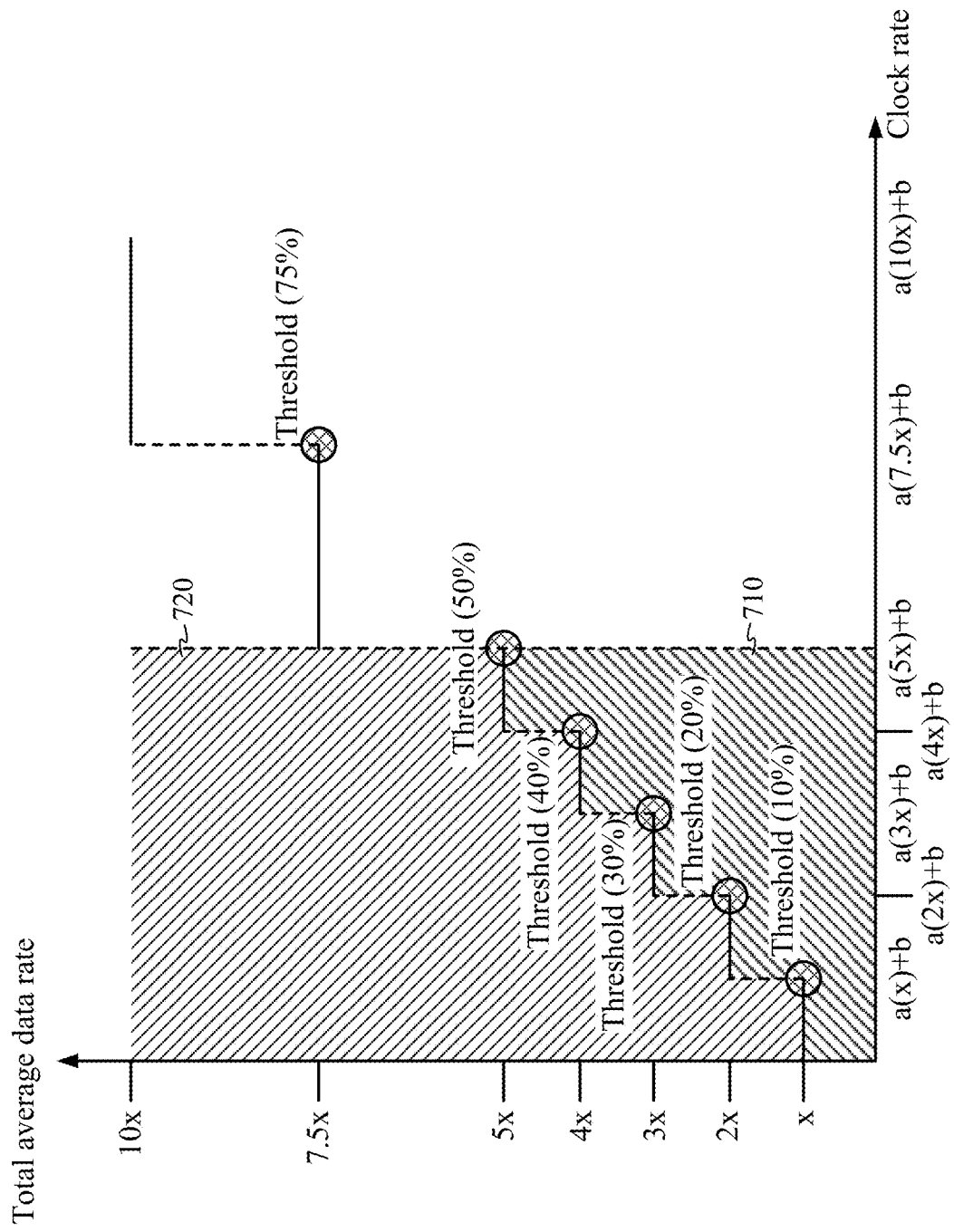
FIG. 7 illustrates the total average data rate at the mobile device as a function of its processor clock rate in accordance with certain embodiments of the present disclosure.

FIG. 7 illustrates the power consumption as a function of the clock rate when processor at the mobile device consumes, illustratively, at a fixed MIPS rate. As shown, lowering a processor clock rate from 600 MHz to 300 MHz may result in a 50% reduction in power consumption. Therefore, under the fixed MIPS rate, the power consumption may be proportional to the processor clock rate, and may be expressed as:

$$P_{total} = P_{initial} + f_{CLK} \cdot P_f,  \quad (4)$$

where $f_{CLK}$ is the processor clock frequency in units of MHz, and $P_f$ is a consumed power per MHz. It can be observed from equation (4) that if the clock frequency is decreased, then the power consumption may be linearly decreased.

FIG. 7 illustrates the total average data rate at the mobile device as a function of its processor clock rate. It is assumed an exemplary case when the threshold activation point is equal to 50% of the total available battery power. A parameter b in FIG. 7 represents an initial minimal clock rate that may be required to drive the processor of the mobile device. A parameter x in FIG. 7 is a constant number referring to the total average data rate from FIG. 5, where a(m·x) represents that the processor clock rate is a function of the total average data rate equal to m·x, where m=1, 2, 3, 4, 5, 7.5, and 10.

As previously described, once the total average data rate is predictable, the MIPS consumption rate is also predictable. This predictability may be used to allow the mobile device to reduce the processor clock rate to further reduce power consumption. As illustrated in FIG. 7, if both the processor clock rate and the data rate (i.e., the MIPS consumption rate) are simultaneously decreased once the available battery power falls below the threshold, then the power consumption may be reduced at a quadratic rate. An area 710 illustrated in FIG. 7 represents an average consumed power if both the processor clock rate and the total average data rate of the mobile devices are simultaneously decreased for the predetermined threshold value of available battery power of 50%. On the other hand, an area 720 represents a saved amount of power consumption at the mobile device if the proposed technique is applied.

By reducing allowable average data rates of a mobile device, processor clock rate and/or MIPS consumption rate, the overall time that connections may be maintained during times of low available battery power may be significantly increased. As a result, the overall mobile user experience may be significantly improved.

Figure 4A:
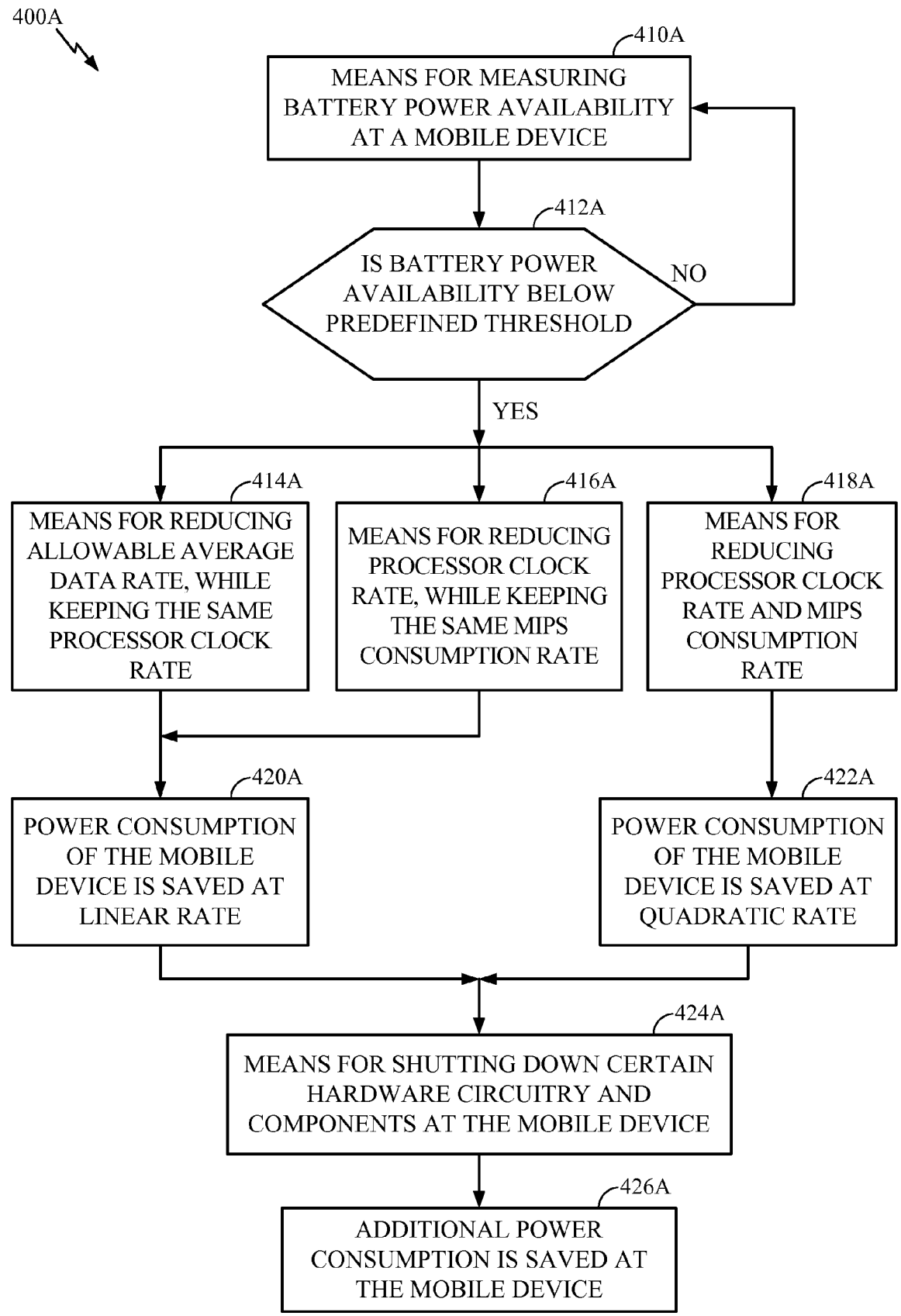
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 410-426 illustrated in FIG. 4 correspond to means-plus-function blocks 410A-426A illustrated in FIG. 4A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   establishing one or more wireless connections with a network;
   monitoring available battery power at a mobile device; and
   reducing an allowable average data rate of the connections as a function of the available battery power,
   wherein reducing the allowable average data rate comprises applying a step function to reduce the allowable average data rate to discrete levels as the available battery power falls below corresponding threshold levels, and wherein reducing the allowable average data rate of the connections as a function of the available battery power further comprises reprioritizing communication links when a Quality of Service (QoS) parameter associated with the communication links is the same.

2. The method of claim 1, further comprising:
   reducing a processor clock rate as a function of the available battery power.

3. The method of claim 2, further comprising:
   reducing an allowable MIPS consumption rate as a function of the available battery power.

4. The method of claim 1, further comprising:
   shutting down hardware circuitry if the available battery power falls below a predefined threshold value.

5. The method of claim 1, wherein reprioritizing communication links comprises:
   reprioritizing communication links using a parameter other than the QoS parameter during a configuration time of the mobile device.

6. The method of claim 1, wherein reprioritizing communication links comprises:
   reducing an average uplink data rate of a communication link that has the same associated QoS value as one or more other communication links, if the available battery power is below the predefined threshold value.

7. An apparatus for wireless communications, comprising:
   a processor;
   memory in electronic communication with the processor; and instructions stored in the memory and executable by the processor to:
      establish one or more wireless connections with a network; monitor available battery power at a mobile device; and
      reduce an allowable average data rate of the connections as a function of the available battery power,
      wherein the allowable average data rate is reduced by applying a step function to reduce the allowable average data rate to discrete levels as the available battery power falls below corresponding threshold levels, and wherein the instructions are executable by the processor to reprioritize communication links when a Quality of Service (QoS) parameter associated with the communication links is the same.

8. The apparatus of claim 7, wherein the instructions are executable by the processor to reduce a processor clock rate as a function of the available battery power.

9. The apparatus of claim 8, wherein the instructions are executable by the processor to reduce an allowable MIPS consumption rate as a function of the available battery power.

10. The apparatus of claim 7, wherein the instructions are executable by the processor to shut down hardware circuitry if the available battery power falls below a predefined threshold value.

11. The apparatus of claim 7, wherein
the instructions are executable by the processor to reprioritize communication links using parameter other than the QoS parameter during a configuration time of the mobile device.

12. The apparatus of claim 7, wherein
the instructions are executable by the processor to reduce an average uplink data rate of a communication link that has the same associated QoS value as one or more other communication links, if the available battery power is below the predefined threshold value.

\* \* \* \* \*